US012572845B2

(12) United States Patent
Betthauser et al.

(10) Patent No.: US 12,572,845 B2
(45) Date of Patent: Mar. 10, 2026

(54) INTELLIGENT MACHINE-LEARNING MODEL CATALOG

(71) Applicant: Microsoft Technology Licensing, LLC, Redmond, WA (US)

(72) Inventors: Leo Moreno Betthauser, Kirkland, WA (US); Urszula Stefania Chajewska, Issaquah, WA (US); Maurice Diesendruck, Bellevue, WA (US); Henry Hun-Li Reid Pan, Sammamish, WA (US); Rohith Venkata Pesala, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 982 days.

(21) Appl. No.: 17/556,648

(22) Filed: Dec. 20, 2021

(65) Prior Publication Data

US 2023/0196181 A1 Jun. 22, 2023

(51) Int. Cl.
*G06N 20/00* (2019.01)

(52) U.S. Cl.
CPC .................................... *G06N 20/00* (2019.01)

(58) Field of Classification Search
CPC ...................................................... G06N 20/00
See application file for complete search history.

(56) References Cited

U.S. PATENT DOCUMENTS

2019/0391956 A1 12/2019 Kozhaya et al.

OTHER PUBLICATIONS

"You might also like this model": Data Driven Approach for Recommending Deep Learning Models for Unknown Image Datasets Ameya Prabhu et. al. (Year: 2020).*
Kuhn, Darl, "Ranking and automatic selection of machine learning models", In Publication of IP.com, Jan. 3, 2018, 34 Pages.
"International Search Report and Written Opinion Issued in PCT Application No. PCT/US22/051759", Mailed Date: Mar. 22, 2023, 15 Pages. (MS# 410803-WO-PCT).
Prabhu, et al., "You might also like this model: Data Driven Approach for Recommending Deep Learning Models for Unknown Image Datasets", In Repository of arXiv:1911.11433v2, May 20, 2020, 14 Pages.
Communication pursuant to Article 94(3) received for European Patent Application No. 22847299.9, mailed on Dec. 22, 2025, 11 pages.

* cited by examiner

*Primary Examiner* — Pei Yong Weng
(74) *Attorney, Agent, or Firm* — Workman Nydegger

(57) ABSTRACT

A computer system is configured to provide an intelligent machine-learning (ML) model catalog containing data associated with multiple ML models. The multiple ML models are trained over multiple training datasets respectively, and the intelligent ML model catalog contains at least multiple training data spaces of embeddings generated based on the multiple ML models and the multiple training datasets. In response to receiving a user dataset, for at least one ML model in the plurality of ML models, the computer system is configured to extract a user data space of embeddings based on the at least one ML model and the user dataset, and evaluate the user data space against the training data space to determine whether the at least one ML model is a good fit for the user dataset.

20 Claims, 11 Drawing Sheets

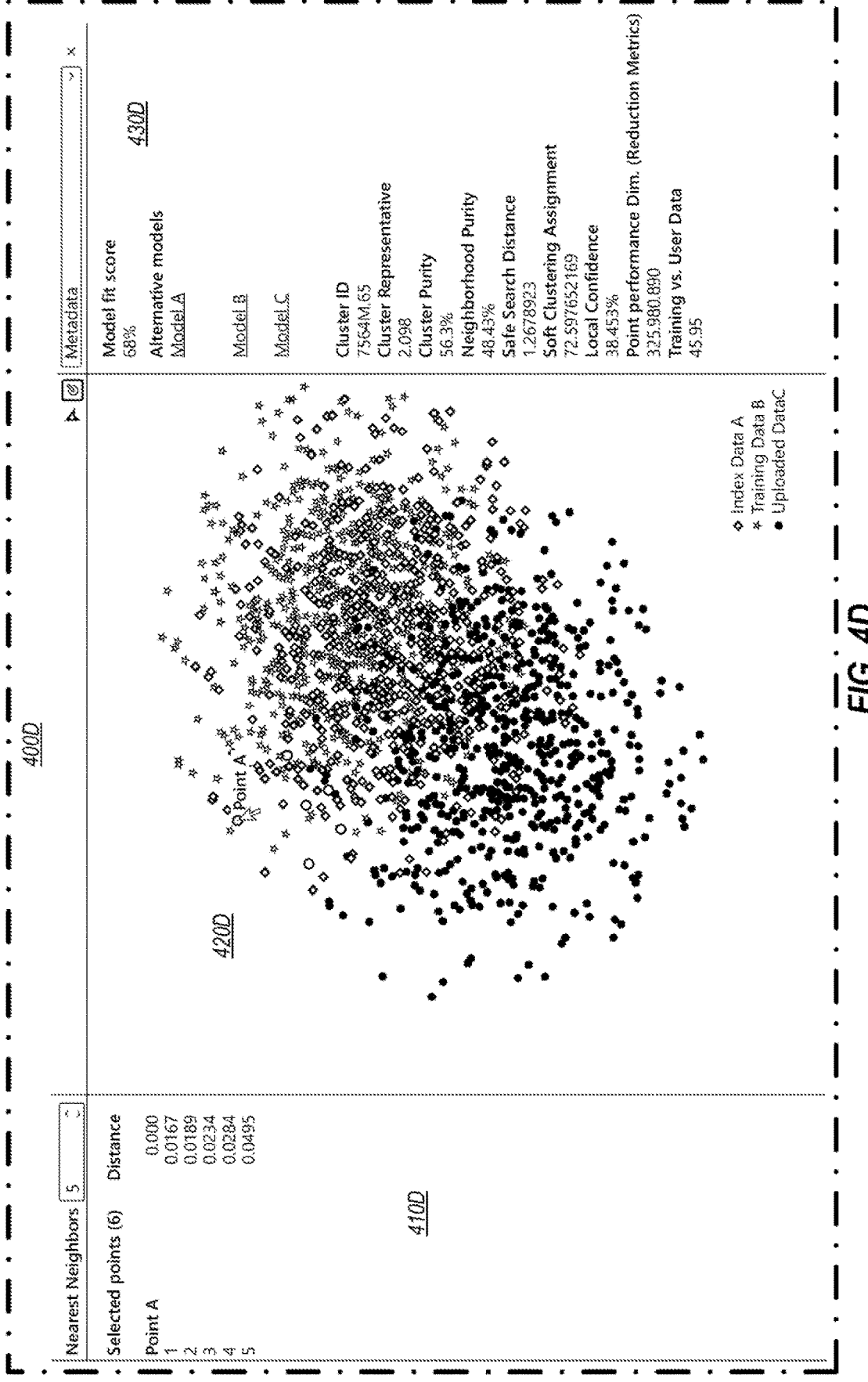
_FIG. 4D_

INTELLIGENT MACHINE-LEARNING MODEL CATALOG

BACKGROUND

In recent years, the field of artificial intelligence has made significant progress in many applications due to the introduction and refinement of representation machine-learning (ML) models. These ML models produce vector representations of input data, also referred to as embeddings. Since each vector generally has a plurality of dimensions, a collection of embeddings forms a multi-dimensional space, also referred to as a space of embeddings. Such a space of embeddings can then be used in downstream tasks: similarity search, classification/regression, language/image generation, and many others.

Many representation learning models for specific modalities (text, image, video, etc.) are pre-trained on large datasets, which may be general-purpose or domain-specific. Some of these learning models are made available to the community. It is often convenient for a user to create a space of embeddings for their dataset from an existing pre-trained model, rather than training their own model from scratch. However, despite the impressive results of many representation learning models, these models produce embedding spaces that are minimally understood by their users.

Further, most pre-trained deep learning models are evaluated against a suite of industry-standard metrics which one hopes (with no theoretical guarantees) measures the generalizability of the model to a different use case within the same modality. However, this assumption can be problematic, and practitioners of machine learning often attempt to fine-tune it for their use case manually.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

The embodiments described herein are related to a computer system configured to provide and access an intelligent machine-learning (ML) catalog containing data associated with a plurality of ML models. The plurality of ML models are trained over a plurality of training datasets, respectively. The intelligent ML model catalog contains at least a plurality of spaces of embeddings (hereinafter also referred to as "training data spaces of embeddings") generated based on the plurality of ML models and the plurality of training datasets, respectively.

The computer system is also configured to receive a user dataset. In response to receiving a user dataset, for at least one ML model in the plurality of ML models, the computer system is configured to extract a space of embeddings (hereinafter also referred to as "the user data space of embeddings") based on the at least one ML model and the user dataset. The computer system then evaluates the user dataset based at least on evaluating the user data space of embeddings against the training data space of embeddings to identify a relationship between the user dataset and the training dataset. Based at least on the identified relationship between the user dataset and the training dataset, the computer system is configured to determine whether the at least one ML model is a good fit for the user dataset.

In some embodiments, the training data space of embeddings is created on the fly when a user dataset is received. Alternatively, the training data space of embeddings is pre-created by the computer system or different computer systems and stored in the intelligent ML model catalog. In some embodiments, creating the intelligent ML model catalog includes, for each ML model in the plurality of ML models, extracting a training data space of embeddings based on the at least one ML model and the training dataset that is used to train the ML model; and storing the training data space of embeddings in the intelligent ML model catalog.

The embodiments described herein are also related to a method for determining whether an ML model in a plurality of ML models is a good fit for a given user dataset. The method includes receiving a user dataset. In response to receiving the user dataset, the method further includes, for at least one of a plurality of ML models, extracting a training data space of embeddings from a training dataset that was used to train the at least one ML model based on the at least one ML model; and extracting a user data space of embeddings from the user dataset based on the at least one ML model. The method further includes evaluating the user dataset based at least on evaluating the user data space of embeddings against the training data space of embeddings to identify a relationship between the user dataset and the training dataset. Based on the identified relationship between the user dataset and the training dataset, it is then determined whether the at least one ML model is a good fit for the user dataset.

The embodiments described herein are also related to a computer program product comprising one or more hardware storage devices having stored thereon an intelligent ML model catalog and computer-executable instructions. The intelligent ML model catalog contains at least a plurality of training data spaces of embeddings generated based on a plurality of ML models and a plurality of training datasets that were used to train the plurality of ML models, respectively. The computer-executable instructions are structured such that, when the computer-executable instructions are executed by one or more processors of a computer system, the computer system is configured to perform at least: receiving a user dataset. For at least one ML model in the plurality of ML models, the computer system is further configured to extract a user data space of embeddings based on the at least one ML model and the user dataset. Thereafter, the user dataset is evaluated based at least on evaluating the user data space of embeddings against the training data space of embeddings to identify a relationship between the evaluation dataset and the training dataset. Based at least on the relationship between the user dataset and the training dataset, it is then determined whether the at least one ML model is a good fit for the user dataset.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not, therefore, to be considered to be limiting in scope, embodiments will be described and explained with additional specificity and details through the use of the accompanying drawings in which:

FIG. 4C-4D illustrate examples of user interfaces of an intelligent ML model catalog that visualizes a user dataset and/or one or more training dataset;

DETAILED DESCRIPTION

In recent years, the field of artificial intelligence has made significant progress in many applications due to the introduction and refinement of representation learning models. These models produce vector representations of input data, also referred to as embeddings. Since each vector generally has a plurality of dimensions, a collection of embeddings forms a multi-dimensional space, also referred to as a space of embeddings. Such a space of embeddings can then be used in downstream tasks: similarity search, classification/regression, language/image generation, and many others.

Figure 1:
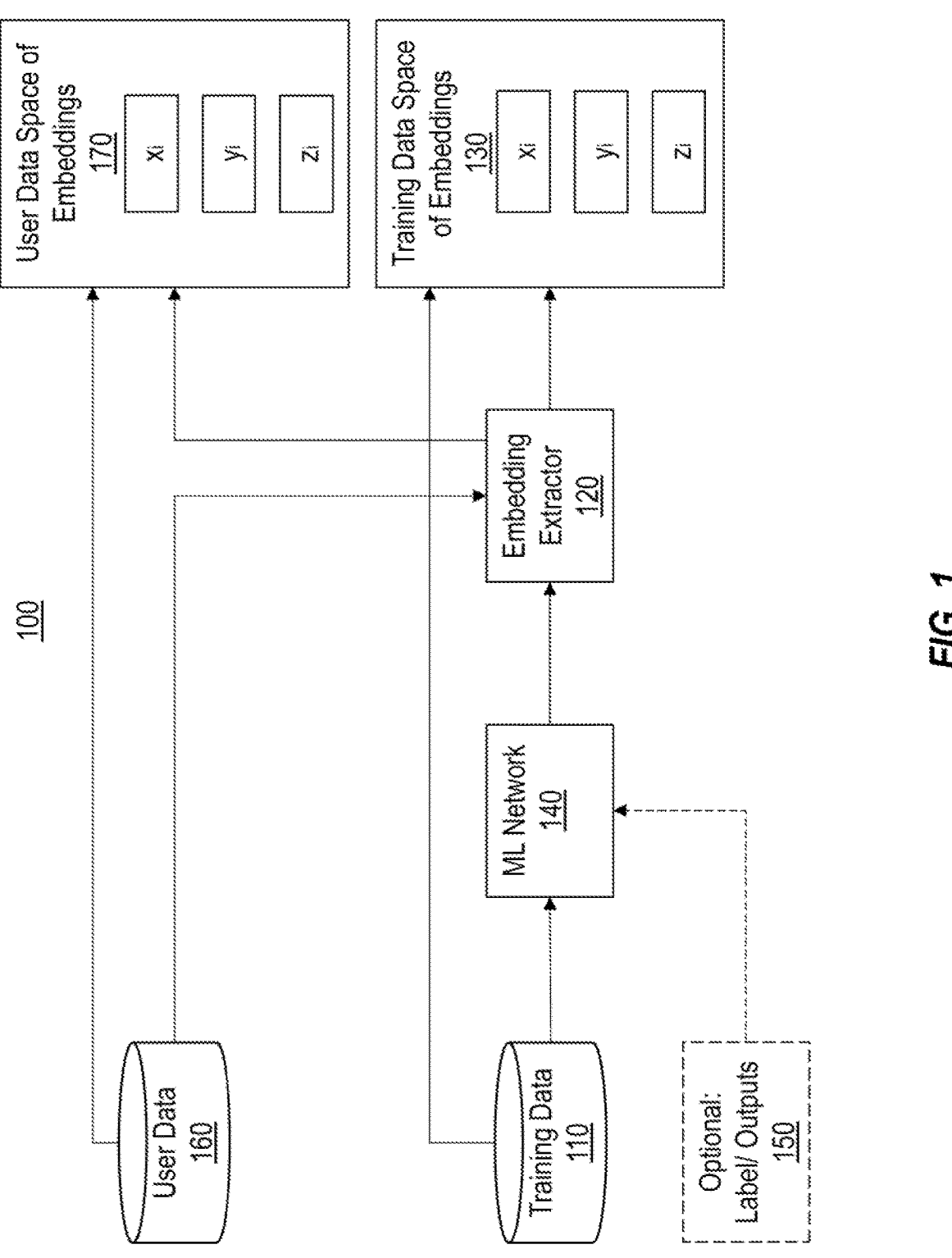
FIG. 1 illustrates an example process of training a machine-learning (ML) model.

Many representation learning models for specific modalities (text, image, video, etc.) are pre-trained on large datasets, which may be general-purpose or domain-specific. FIG. 1 illustrates an example process of training an ML model 100 using training dataset 110. In some embodiments, the ML 100 is trained on data further including labels and outputs 150. When there are no labels, the learning is unsupervised learning, and when there are labels, the learning is supervised learning. As illustrated in FIG. 1, the embedding extractor 120 is configured to extract a training data space of embeddings 130 based on a training dataset 110. Each embedding is a vector representation of a data item in the training dataset 110. The embedding or vector representation can be any dimensional. For example, if the embeddings are three-dimensional, each embedding can be represented by three values $(x_i, y_i, z_i)$. For example, the first data item in the training dataset is represented by embedding $(x_1, y_1, z_1)$; the second data item in the training dataset is represented by embedding $(x_2, y_2, z_2)$, and so on and so forth. As such, all the data items in the training dataset form the training data space of embeddings 130.

The ML network 140 can be trained for many different purposes, such as (but not limited to) a classifier, an anomaly detector, etc. For example, when the ML network 140 is trained to be a classifier, in response to receiving an unknown data item, the ML network 140 is configured to classify the unknown data item into one of a plurality of classes of items. As another example, when the ML network 140 is trained to be an anomaly detector, in response to receiving an unknown data item, the ML network 140 is configured to determine whether the unknown data item is anomalous.

The trained embedding extractor 120 can then be used to extract a space of embeddings based on a user dataset 160 (also referred to as a user data space of embeddings 170).

Figure 2:
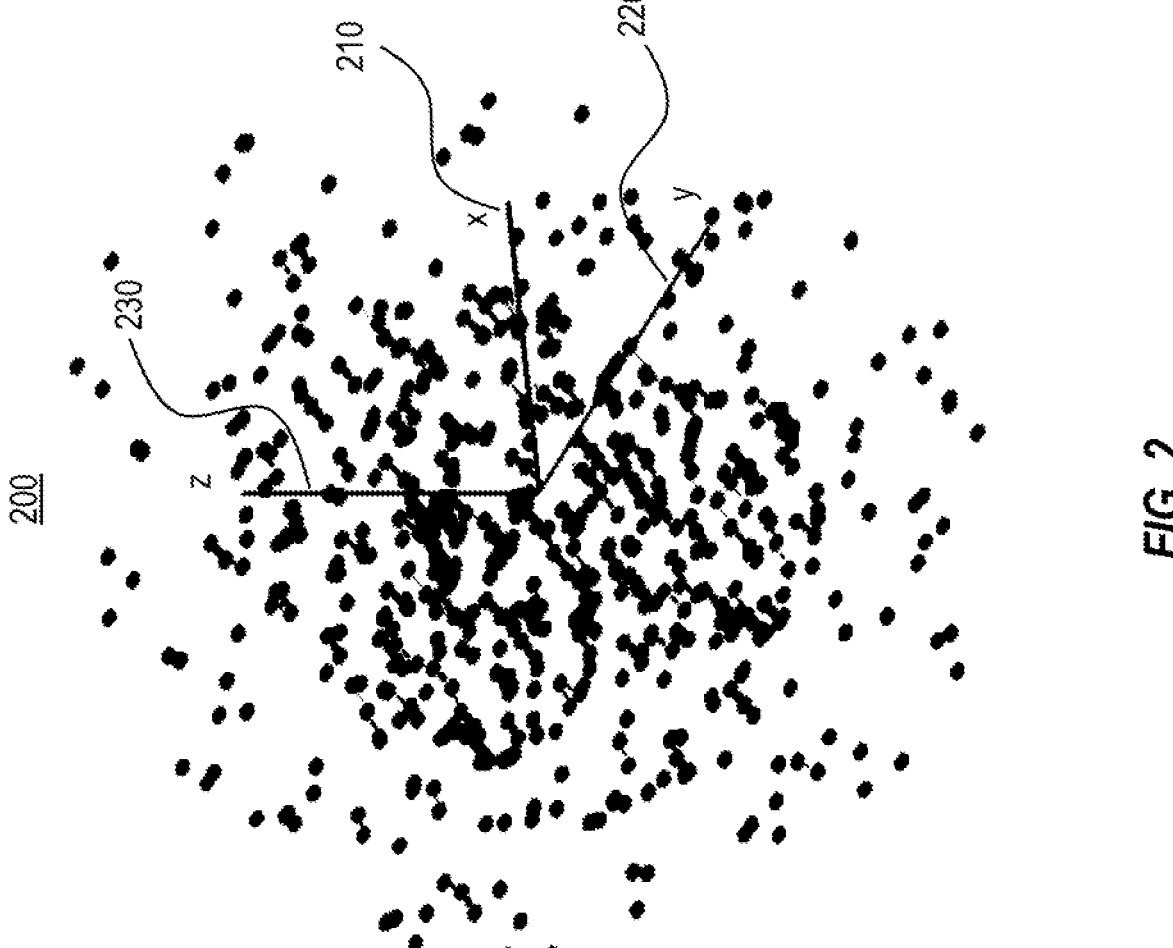
FIG. 2 illustrates a three-dimensional chart representing a space of embeddings.

In some embodiments, a space of embeddings (extracted from a training dataset 110 or a user dataset 160) can be visualized in a multi-dimensional chart. FIG. 2 illustrates an example of a three-dimensional chart 200 that represents a three-dimensional space of embeddings (which may correspond to the space of embeddings 130 of FIG. 1). As illustrated in FIG. 2, the three-dimensional chart 200 includes an x-axis 210, a y-axis 220, and a z-axis 230, each of which represents one of three dimensions of the space of embeddings. The three-dimensional chart 200 also includes a plurality of points, each of which represents an embedding corresponding to a data item in a training dataset 110 or a user dataset 160. In some embodiments, when the dimensionality of the embeddings is larger than 3 (which is fairly common), a dimensionality reduction tool is provided to reduce that dimension for visualization purposes.

Notably, training a new model from scratch is usually a time and/or resource-consuming process. Since many different learning models are made available to the community, it is often convenient for a user to create a space of embeddings for their dataset from an existing pre-trained model, rather than training their own model from scratch. Despite the impressive results of many representation learning models, these models produce embedding spaces that are minimally understood by their users.

Further, most pre-trained deep learning models are evaluated against a suite of industry-standard metrics which one hopes (with no theoretical guarantees) measures the generalizability of the model to a different use case within the same modality. This assumption can be problematic, and practitioners of machine learning often attempt to fine-tune it for their use case manually. The issue arises in many business applications where the problem may be critical, but labeled data is sparse. However, in almost all circumstances, there exists plentiful unlabeled data, and multiple models, for nearly all input modalities (image, text, sound, etc.).

Currently, there exists no systematic set of tools to determine a model's generalizability—its ability to be used beyond the specific application for which it was trained. This creates a complicated question surrounding identifying which model from a collection of models is best suited for a new unknown dataset (hereinafter also referred to as a "user dataset"). This question is non-trivial, especially when the user does not have labels to utilize for downstream evaluation.

The principles described herein are related to a system and/or a method that leverages the raw user (unlabeled) dataset and computes statistics based on the resulting geometric and topological shapes of the models' output representations at an instance level and overall level. A collection of these statistics is analyzed to identify differences when performed on the raw user dataset versus on each model's training data. The analysis, therefore, provides quantitative measures of how performant each potential model is for a given dataset. Further, recommendations and specific ways in which each model is performant or potentially deficient may be provided. In some embodiments, the system is configured to recommend an ML model that provides the preferred balance of efficiency, robustness, generalization, preservation of semantic relationships, and utility in downstream applications.

In embodiments, a toolkit (also referred to as an intelligent ML model catalog) is created based on topological data analysis and computational geometry analysis of arbitrary embedding spaces from supervised or unsupervised models. When the original ML model is accessible, the ML model can be used to obtain embeddings for the user dataset. The embedding space based on the user dataset can then be compared to the embedding space based on training data.

In some embodiments, the system is configured to create cluster assignments by assigning each new embedding to the closest cluster central member from the original dataset to measure discriminative topological features between original and new embeddings such as persistent homology and graph alignments.

By analyzing clustering properties, identifying differences between embedding distributions of training and user datasets, and highlighting risks associated with different implementations of similarity search, the toolkit can allow the user to make an informed decision on how a pre-trained model is likely to work for their application. In some embodiments, when additional information is given (such as metadata associated with training datasets), this intelligent ML model catalog can further provide a broader set of evaluations, which help answer questions about model robustness, efficiency, and reusability.

Figure 3:
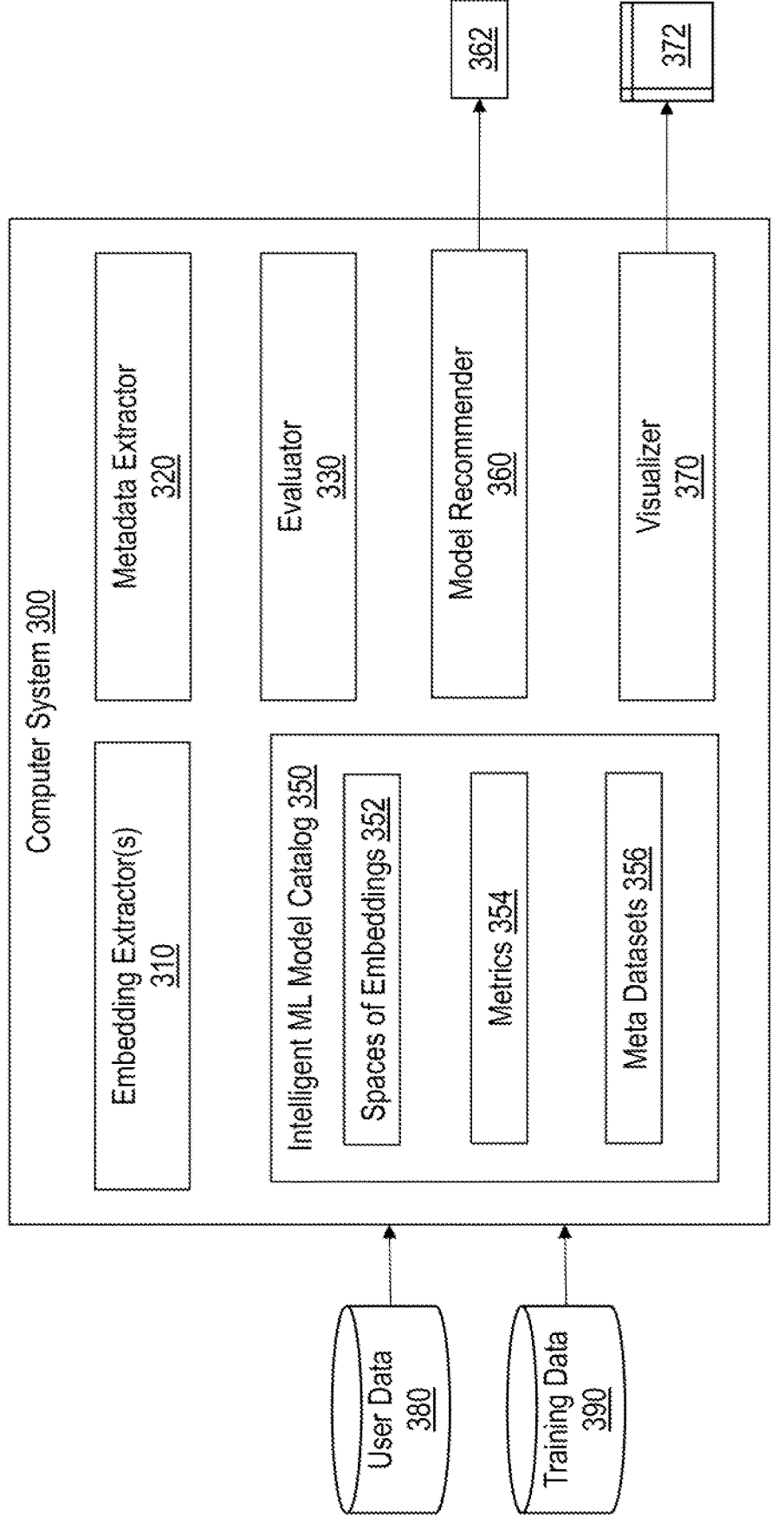
FIG. 3 illustrates an example architecture of a computer system that implements the principles described herein.

The intelligent ML model catalog is implemented at one or more computer systems (which are also referred to as the "system"). FIG. 3 illustrates an example of a computer system 300 configured to provide an intelligent ML model catalog 350. The intelligent ML model catalog 350 contains data associated with a plurality of ML models. The plurality of ML models are trained over a plurality of training datasets 390, respectively.

In some embodiments, the ML model catalog 350 contains at least a plurality of spaces of embeddings 352 (also referred to as "training data spaces of embeddings") that are pre-created based on the plurality of ML models and the plurality of training datasets 390, respectively. For example, the embedding extractors 310 is configured to extract a first space of embeddings generated based on a first ML model and a first dataset that is used to train the first ML model, a second space of embeddings generated based on a second ML model and a second dataset that is used to train the second ML model, and so on and so forth.

In some embodiments, the plurality of spaces of embeddings 352 are created on the fly when the user dataset 380 is received. In such embodiments, the computer system 300 includes a plurality of embedding extractors 310, each of which is configured to extract a space of embeddings based on a corresponding ML model. The intelligent ML model catalog 350 contains addresses of the plurality of training datasets 390. The plurality of embedding extractors 310 is configured to extract a plurality of training data spaces of embeddings based on the training datasets 390 and the plurality of ML models.

The plurality of embedding extractors 310 are also configured to extract a space of embeddings (also referred to as a "user data space of embeddings") for a given user dataset 380 based on one of the plurality of ML models. For example, the first embedding extractor is configured to extract a first user data space of embeddings from the user dataset 380 based on the first ML model, the second embedding extractor is configured to extract a second user data space of embeddings from a given dataset based on a second ML model, and so on and so forth.

The computer system 300 also includes an evaluator 330 configured to evaluate the user dataset 380 against any one (or each) of the training datasets 390 that are used to train the plurality of ML models. In particular, the evaluator 330 is configured to at least evaluate two spaces of embeddings (generated from a training dataset 390 and the user dataset 380, respectively) to identify a relationship between the user dataset 380 and the corresponding training dataset 390. In some embodiments, the evaluation is performed using topological data analysis and computational geometry. In some embodiments, the evaluator 330 also quantifies how well the model captures intuitive notions of concepts and semantic relationships.

In some embodiments, the evaluator 330 has two overarching themes, namely (1) intrinsic evaluations and (2) extrinsic evaluations. The intrinsic evaluations evaluate the user dataset 380 based only on the user data space of embeddings generated by a user dataset provided 380 by a user and the training data space(s) of embeddings. For example, in some embodiments, the intrinsic evaluations include (but are not limited to) (1) dimensionality evaluation, (2) robustness evaluation, (3) statistical properties of clustering evaluation (in which a clustering model created for a training dataset is applied to the user embedding space), or (4) search performance evaluation.

The evaluator 330 is further configured to compute one or more metrics for both the training dataset 390 and the user dataset 380. The evaluation of the user dataset 380 is further based on evaluating the one or more metrics of the user dataset against the one or more metrics for the training dataset.

In some embodiments, the one or more metrics for each training data space are computed on the fly when the user dataset 380 is received. Alternatively, the one or more metrics 354 are precomputed and stored in the intelligent ML model catalog 350. In some embodiments, the one or more metrics 354 include a first set of metrics computed based on embeddings alone. The first set of metrics includes (but is not limited to) randomness score, k-nearest neighbor (kNN) distance statistics, kNN recall statistics, clustering statistics (including between-cluster separation, within-cluster homogeneity, data likelihood scores given the clustering, average silhouette width, gap statistic), neighborhood purity statistics. The first set of metrics are computed just based on the training embedding space, alternatively, a metric value is computed for each of a training and user embedding spaces separately, and the two metric values are compared to generate a relative metric value.

In some embodiments, the one or more metrics 354 further include a second set of metrics computed based on both spaces of embeddings and cluster assignments. The second set of metrics is designed to compare two embeddings directly. The second set of metrics includes (but is not limited to) Hausdorff distance, energy distance, distribution distance, etc.

In some embodiments, the one or more metrics 354 further include a third set of metrics based on both spaces of embeddings and a user input (if applicable). The third set of metrics includes (but is not limited to) relationship preservation scores based on a comparison of scores between two embedding spaces.

In some embodiments, the computer system 300 further includes a recommender 360. After the evaluator 330 evaluates the user dataset 380 against training datasets 390 and/or computes statistics for the user dataset 380 and/or training datasets 390, recommender 360 is configured to provide a recommendation. For example, in some embodiments, the recommender 360 is configured to provide a scorecard for each of the one or more models, with scores broken down by category, including (but not limited to) overall robustness score, overall efficiency score, and overall domain/distribution-match score. In some embodiments, the recommender 360 is also configured to summarize results across models and suggest models of best fit for each use case. In some embodiments, the recommender 360 assigns a weight to each of the scores, and generates an overall score based on the weighted average of all the scores. The recommendation is generated based on the overall score.

In some embodiments, the recommender 360 is also configured to rank or filter models, and the recommendation is based on the ranked and filtered list of ML models. In some embodiments, the ranking and/or filtering can also be controlled or modified by a user, to favor specific features or metrics. In some embodiments, models can be included or excluded, with expectations detailing which scores were sufficiently or insufficiently high.

The extrinsic evaluations are configured to evaluate user dataset 380 using one or more additional sets of domain knowledge, metadata, original model, input data, and partial or full labels (hereinafter collectively referred to as "metadata"). In some embodiments, such additional sets of metadata 356 associated with training datasets 390 are extracted on the fly. Alternatively, such additional sets of metadata 356 are pre-extracted and stored in the intelligent ML model catalog 350. In some embodiments, the computer system 300 further includes a metadata extractor 320 configured to extract metadata from the user dataset 380 and/or the training datasets 390. In some embodiments, the metadata 356 of the training datasets 390 are pre-extracted and stored in the intelligent ML model catalog 350.

In some embodiments, the extrinsic evaluations further include (but are not limited to) evaluating robustness to noise, invariance to transformations, amenability to feature selection, preservation of concepts like hierarchy, and adherence to expert guidance. For example, in some embodiments, some ML models are tagged with useful labels like good for classification, or compressible representation. The recommender 360 is configured to provide recommendations based on the labels. As another example, in some embodiments, the recommender 360 is further configured to provide model recommendations 362 based on metadata, such as data type and data content. For example, given a training dataset location, the system 300 is configured to recognize data type by evaluating file extensions, and to test the user dataset 380 to ensure that instances of the user dataset 380 can be loaded and read without error.

Notably, a full training dataset 390 and/or the user dataset 380 may be very large. To produce spaces of embeddings for a large training dataset 390 or the user dataset 380 could take a longer than desired amount of time. In some embodiments, the system 300 is configured to select a representative subset of the training dataset 390 and/or the user dataset 380. The spaces of embeddings are produced based on a representative subset, and use a data type-appropriate model. For example, in some embodiments, the system 300 is configured to sample the training dataset 390 and/or the user dataset 380 and generate a space of embeddings based on the sampled data items. In some embodiments, the system 300 is configured to randomly select a predetermined number of data samples from the training dataset 390 and/or the user dataset 380, and generate a space of embeddings based on the predetermined number of data samples. In some embodiments, the sampling happens after the embedding extraction.

The intrinsic evaluations and extrinsic evaluations, taken together, provide descriptive, prescriptive, and cautionary information that allows a user to understand the behavior of their embedding space with respect to a given model, and whether that model is sufficient or deficient for certain downstream tasks and applications. In some embodiments, based on the intrinsic and/or extrinsic evaluations, ranking and/or filtering operations, the computer system 300 is configured to determine (1) whether any ML model in the intelligent ML model catalog is a good fit for the new data, (2) how well the user data space of embeddings will lend themselves to a classification task, and/or (3) how likely the user data space of embeddings will produce reasonable similarity search results.

As such, the computer system 300 is configured to compare data embeddings generated from training datasets of each model in an intelligent ML model catalog 350 with data embeddings generated from a user dataset of the corresponding model, where the training data spaces of embeddings are optionally pre-computed or computed on the fly. The computer system 300 is also configured to rank models in the intelligent ML model catalog based on content match, such as distribution distance between sets of embeddings (user dataset 380 vs. training dataset 390). For example, the computer system 300 might recognize and process a dataset of x-ray images, and therefore give a higher rank to a medical image model, compared to a generic model. In some embodiments, newly trained models can also be added to the intelligent ML model catalog 350.

In some embodiments, the computer system 300 also includes a visualizer 370 configured to visualize the user data space of embeddings and/or at least one training data space of embeddings in a multi-dimensional chart 372.

In some embodiments, the visualizer 370 further visualizes the most similar results to a given query point, using graph that is generated from the embeddings. This allows the user to determine if the search is useful, or if it is making errors. As discussed above, a training dataset 390 and the user dataset 380 can be very large. In some embodiments, the visualizer 370 is also configured to visualize only the typical members of each cluster, optionally highlighting points near the boundaries of clusters, which might represent risks in downstream applications.

Figure 4A:
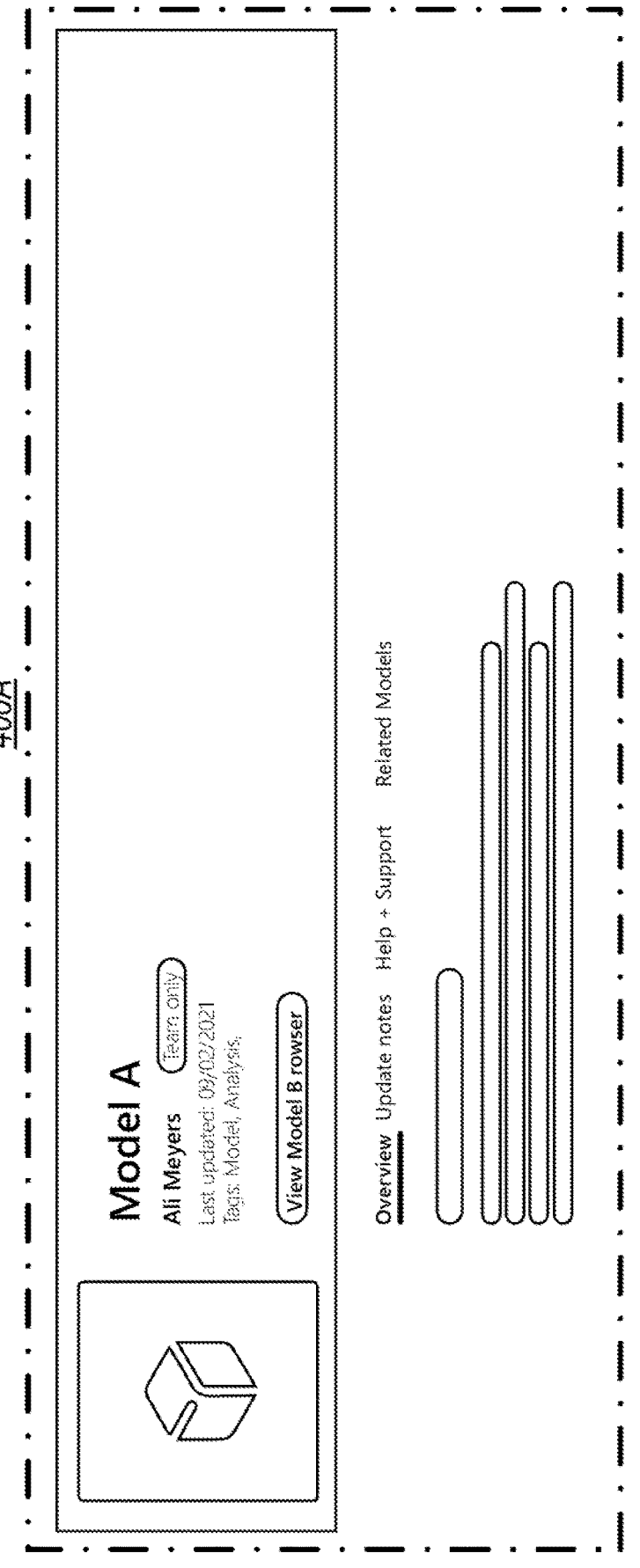
FIGS. 4A-4B illustrate examples of user interfaces of an ML model browser configured to allow users to browse different ML models in an intelligent ML model catalog.
Figure 4B:
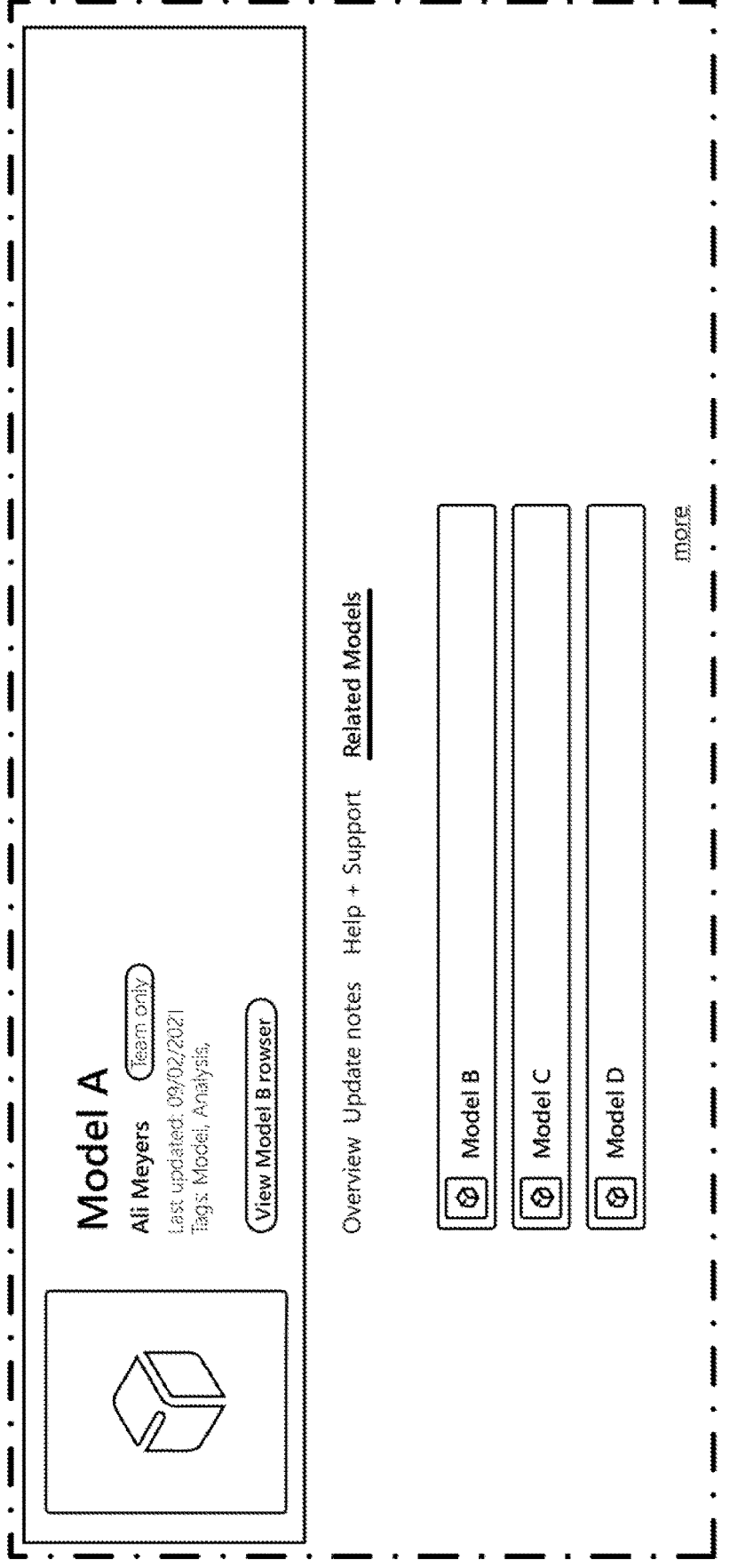

FIGS. 4A-4D illustrate different example user interfaces that may be provided from the computer system 300 to users. FIGS. 4A-4B illustrate examples of a model browser interface 400A, 400B, through which a user can browser different ML models in the intelligent ML model catalog. For example, a user can select any one of the ML models (e.g., Model A) to browse the information related to the selected ML model. As illustrated in FIG. 4A, the model browser interface 400A includes a plurality of tabs, such as (but not limited to) an overview tab, an update notes tab, a help and support tab, and a related models tab. As illustrated in FIG. 4B, when the related models tab is selected, one or more related models that are related to the selected model are displayed. For example, the user has selected Model A, and the model browser interface 400B shows that Model B, Model C, and Model D are related to Model A.

Figure 4C:
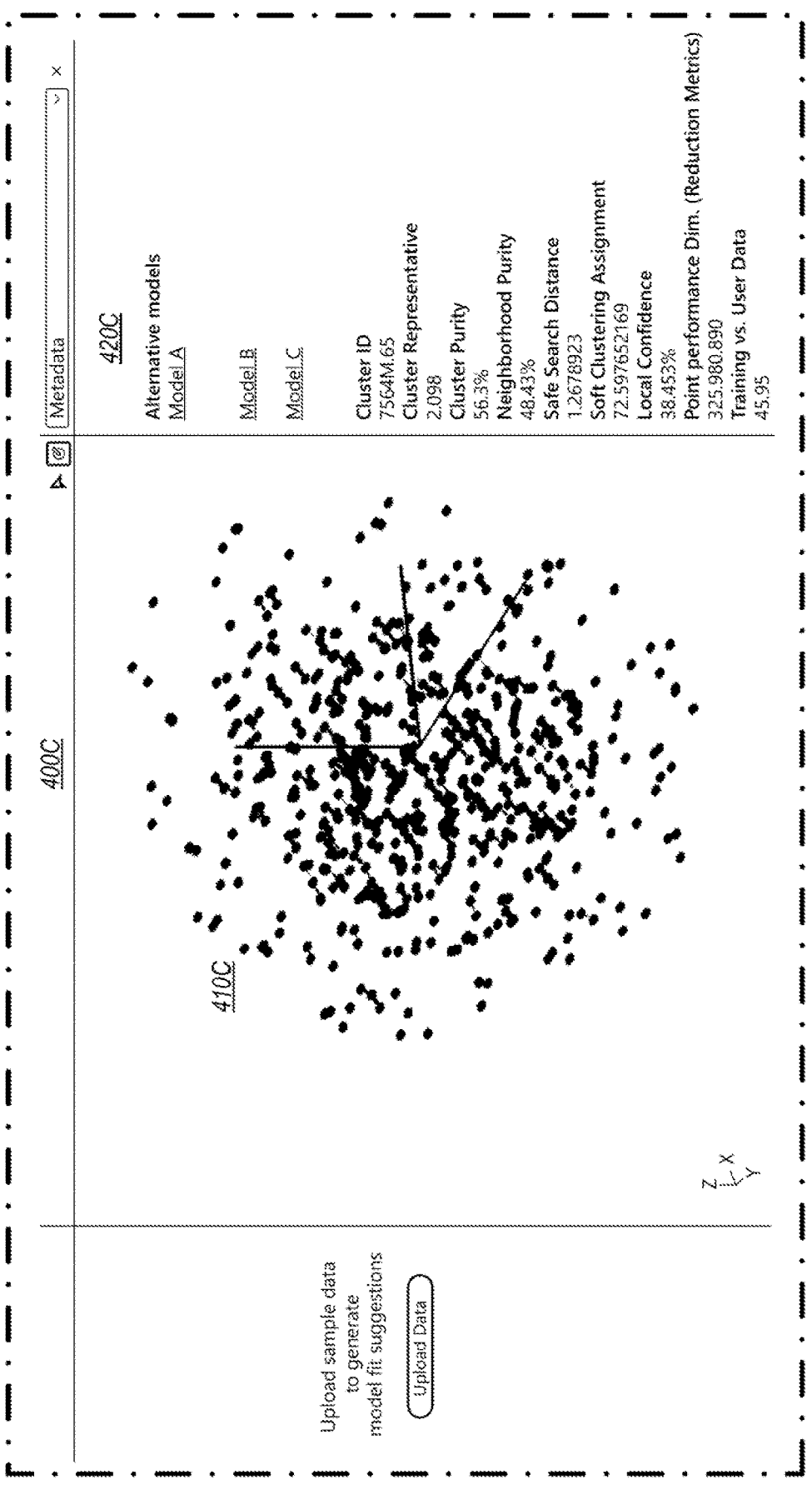

FIGS. 4C and 4D illustrate examples of a visualization interface 400C, 400D that visualizes one or more spaces of embeddings, which may correspond to a user data submitted by a user and/or one or more training datasets 390 that are used to train one or more ML models. For example, as illustrated in FIG. 4C, the visualization interface 400C shows a visualization section 410C, displaying a multi-dimensional chart that represents a space of embeddings extracted from a user dataset submitted by a user. The visualization interface 400C also includes a metadata section 420C that displays metadata associated with a recommended model, its training dataset 390, and the user data. The metadata section 420C also shows one or more alternative models recommended to the user.

FIG. 4D illustrates that in response to receiving a user selection of point A on a multi-dimensional chart 420D and kNN (e.g., 5NN), the computer system presents the five nearest neighbors of the selected point A in an embedding view panel 410D. The computer system further computes a model fit score for a recommended model in a metadata panel 430D.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 5:
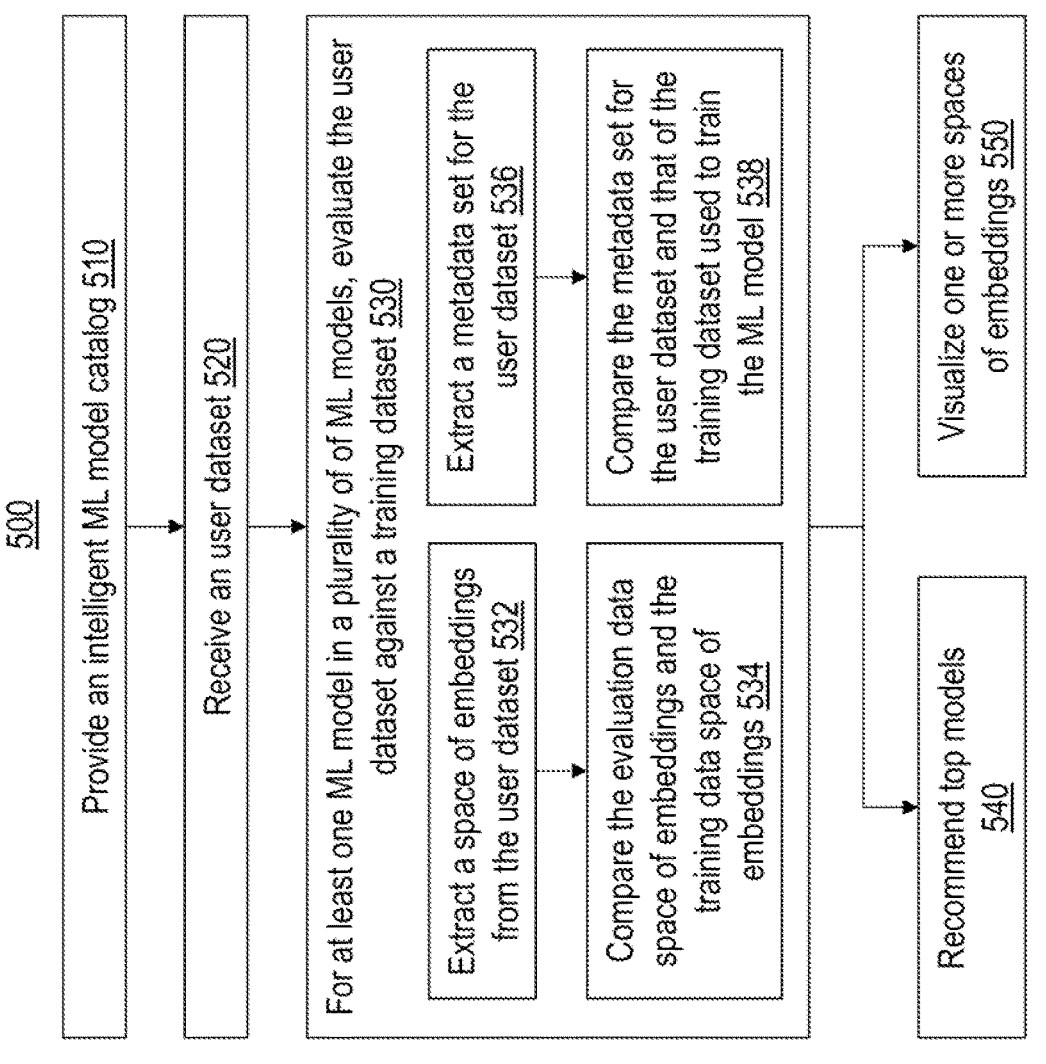
FIG. 5 illustrates a flowchart of an example method for recommending ML models for any given evaluation dataset using a pre-created intelligent ML model catalog.

FIG. 5 illustrates a flowchart of an example method 500 for recommending ML models for any given user dataset. The method 500 includes accessing an intelligent ML model catalog (act 510). The intelligent ML model catalog contains data associated with a plurality of ML models. The plurality of ML models are trained over a plurality of training datasets respectively. The intelligent ML model catalog contains at least a plurality of training data spaces of embeddings generated based on the plurality of ML models and the plurality of dataset, respectively.

The method 500 also includes receiving a user dataset (act 520). The method 500 also includes, for at least one ML model in a plurality of ML models, evaluating the user dataset against a training dataset that was used to train the at least one ML model (act 530). In some embodiments, Act 530 includes, for at least one ML model in the plurality of models, a space of embeddings (also referred to a user data space of embeddings) is extracted from the user dataset based on the at least one ML model (act 532), and the user data space of embeddings is evaluated against a training data space of embedding corresponding to the at least one ML model to identify a relationship between the user dataset and the training dataset (act 534).

In some embodiments, act 530 also includes extracting a meta dataset for the evaluation dataset (act 536) and evaluating the meta dataset for the evaluation dataset against a meta dataset for the training dataset to identify a second relationship between the user dataset and the training dataset (act 538). In some embodiments, the meta dataset for the training dataset is pre-computed and stored I the intelligent ML model catalog. Alternatively, the meta dataset for the training data is computed on the fly.

In some embodiments, the method 500 further includes recommending one or more top ML models that are best fit for training the new model over the user data (act 540). In some embodiment, the method 500 further includes visualizing one or more spaces of embeddings and/or relationships between the evaluation dataset and the training dataset (act 550). For example, in some embodiments, visualizing one or more spaces of embeddings include (but are not limited to) visualizing the user data space of embeddings, one or more training data spaces of embeddings corresponding to the recommended top ML models, and/or a training data space of embedding corresponding to user-selected ML model(s). In some embodiments, a whole space of embeddings is visualized. Alternatively, only a subset of representative members of a space of embeddings is visualized.

Figure 6:
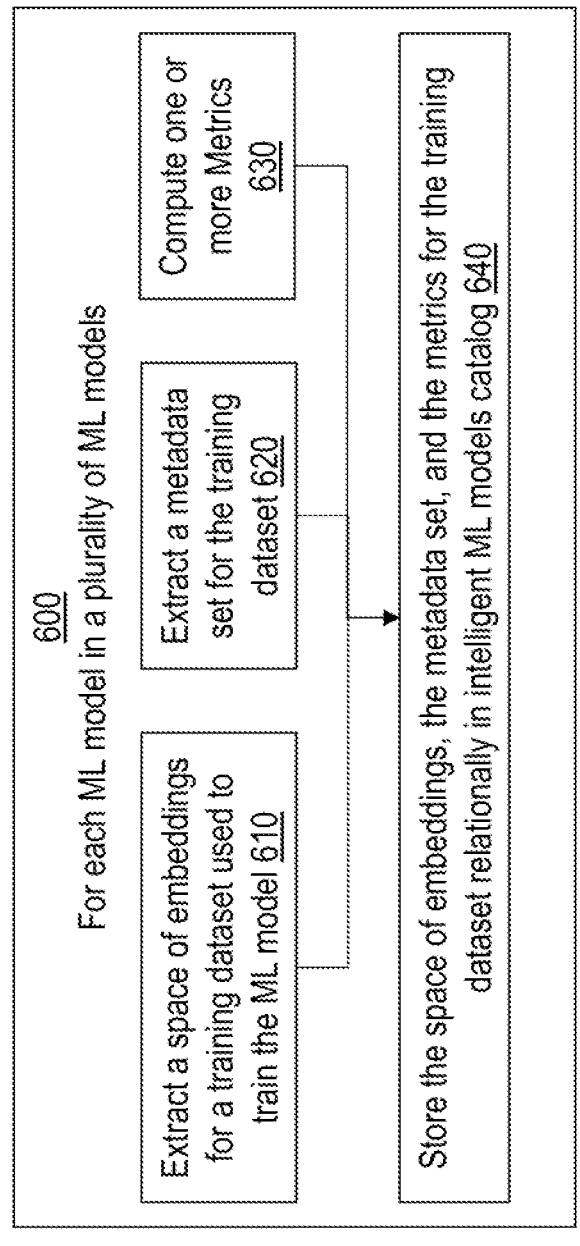
FIG. 6 illustrates a flowchart of an example method for creating an intelligent ML model catalog.

In some embodiments, the intelligent ML model catalog is pre-created. FIG. 6 illustrates a flowchart of an example method 600 for creating an intelligent ML model catalog. The method 600 includes for each ML model in a plurality of ML models, extracting a space of embeddings for a training dataset used to train the ML model (act 610). In some embodiments, the method 600 further includes extracting a metadata set for each training dataset (act 620). In some embodiments, the method 600 further includes computing one or more metrics associated with each training dataset (act 630). The method 600 also includes storing the space of embeddings, the meta dataset, and/or the one or more metrics for each training dataset relationally in the intelligent ML model catalog (act 640).

Figure 7:
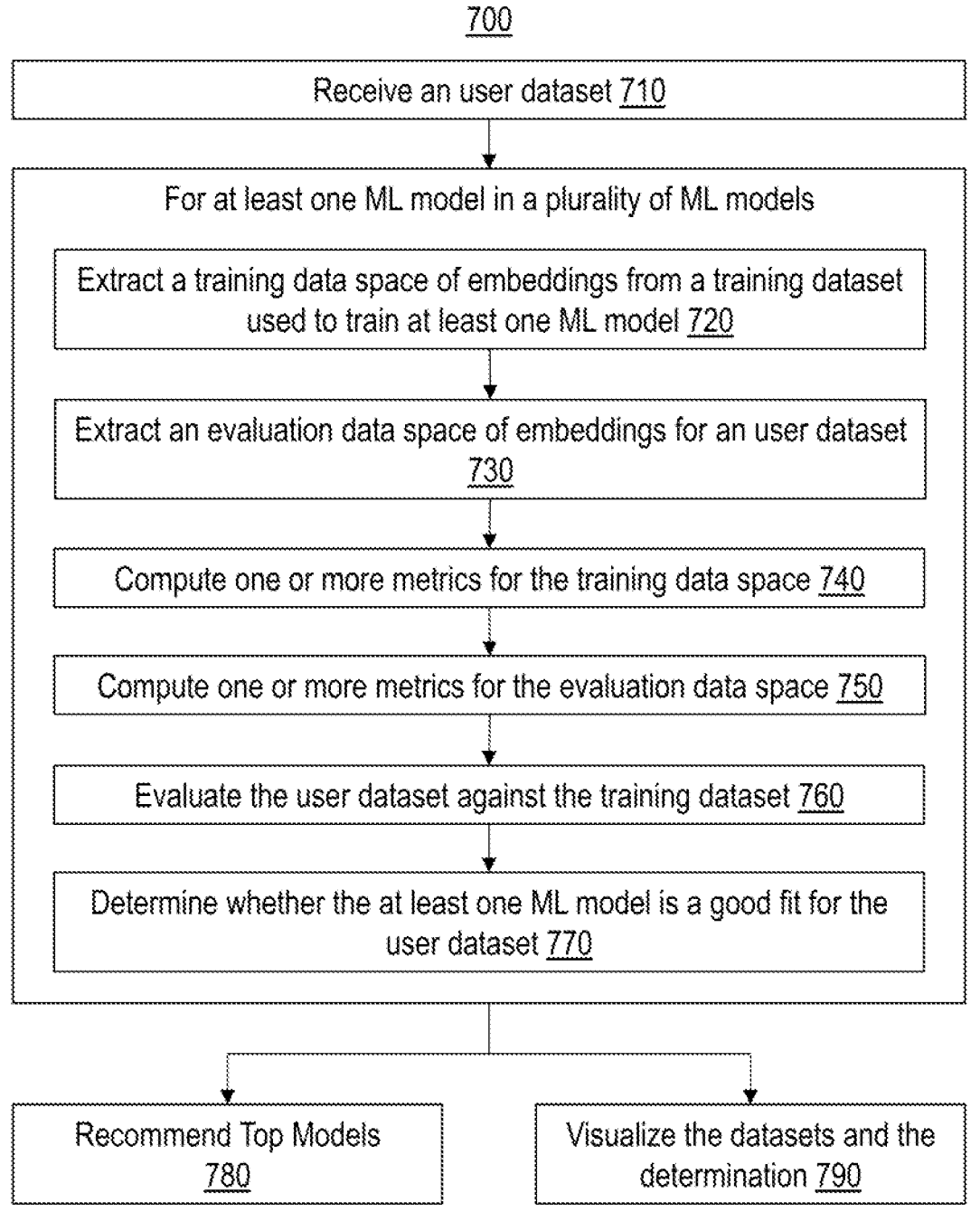
FIG. 7 illustrates a flowchart of another example method for recommending ML models for any given user dataset.

In some embodiments, the intelligent ML model catalog is an instance that only contains addresses of a plurality of training datasets and/or ML models; the space of embeddings are generated on the fly in response to receiving a user dataset from a user. FIG. 7 illustrates a flowchart of another example method 700 for recommending ML models for any given user dataset. The method 700 includes receiving a user dataset (act 710). The method 700 further includes for at least one ML model in a plurality of ML models, extracting a training data space of embeddings from a training dataset that was used to train the at least one ML model based on the at least one ML model (act 720) and extracting a user data space of embeddings from a user dataset based on the at least one ML model (act 730). For example, in some embodiments, the training dataset and/or the ML model are retrieved based on the address contained in the intelligent ML model catalog, and the training data space of embeddings is extracted based on the retrieved training data and the ML model. In some embodiments, the method 700 further includes computing one or more metrics for the training data space (act 740) and computing one or more metrics for the user data space (act 750).

The user dataset is then evaluated against the training dataset to identify a relationship between the user dataset and the training dataset (act 760). In some embodiments, act 760 includes evaluating the user data space of embeddings against the training data space of embeddings. In some embodiments, the act 760 further includes evaluating the one or more metrics for the user data space against the one or more metrics for the training data space.

Based on the evaluation, it is then determined whether the at least one ML model is a good fit for the user dataset (act 770). In some embodiments, the method 700 further includes recommending one or more top models (act 780) and/or visualizing the user dataset and/or the training dataset (act 790).

Finally, because the principles described herein may be performed in the context of a computer system, some introductory discussion of a computer system will be described with respect to FIG. 8.

Computer systems are now increasingly taking a wide variety of forms. Computer systems may, for example, be hand-held devices, appliances, laptop computers, desktop computers, mainframes, distributed computer systems, data centers, or even devices that have not conventionally been considered a computer system, such as wearables (e.g., glasses). In this description and in the claims, the term "computer system" is defined broadly as including any device or system (or a combination thereof) that includes at least one physical and tangible processor, and a physical and tangible memory capable of having thereon computer-executable instructions that may be executed by a processor. The memory may take any form and may depend on the nature and form of the computer system. A computer system may be distributed over a network environment and may include multiple constituent computer systems.

Figure 8:
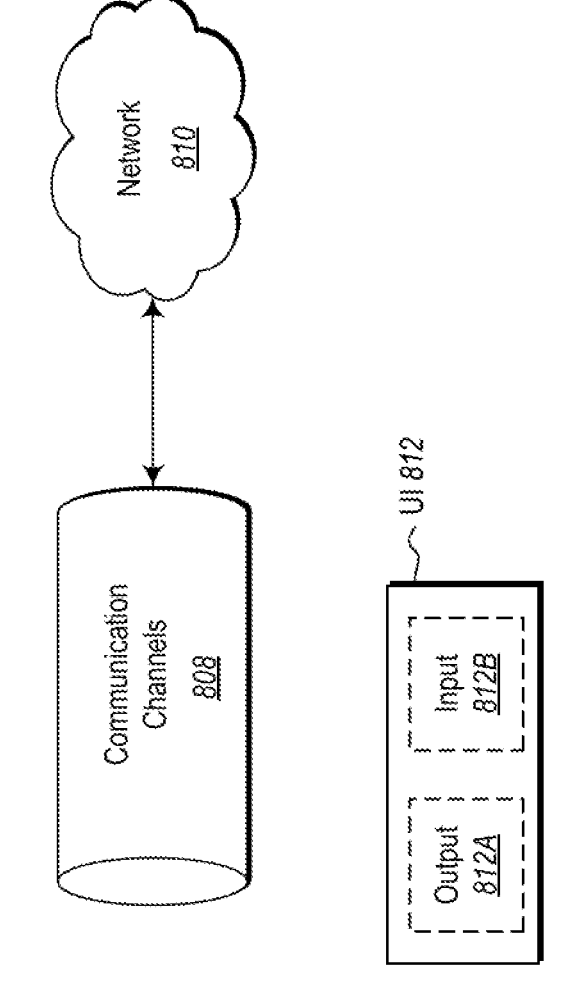
FIG. 8 illustrates an example computer system in which the principles described herein may be employed.
Figure 8:
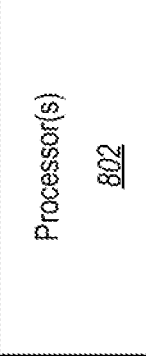
Figure 8:
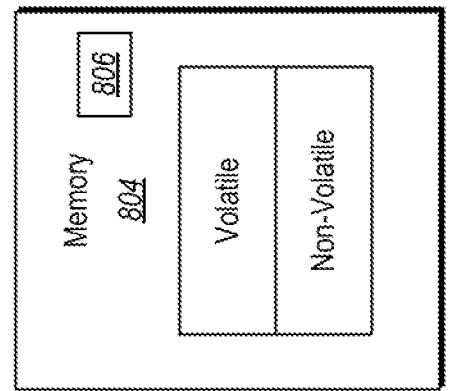

As illustrated in FIG. 8, in its most basic configuration, a computer system 800 typically includes at least one hardware processing unit 802 and memory 804. The processing unit 802 may include a general-purpose processor and may also include a field-programmable gate array (FPGA), an application-specific integrated circuit (ASIC), or any other specialized circuit. The memory 804 may be physical system memory, which may be volatile, non-volatile, or some combination of the two. The term "memory" may also be used herein to refer to non-volatile mass storage such as physical storage media. If the computer system is distributed, the processing, memory and/or storage capability may be distributed as well.

The computer system 800 also has thereon multiple structures often referred to as an "executable component". For instance, memory 804 of the computer system 800 is illustrated as including executable component 806. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computer system, whether such an executable component exists in the heap of a computer system, or whether the executable component exists on computer-readable storage media.

In such a case, one of ordinary skill in the art will recognize that the structure of the executable component exists on a computer-readable medium such that, when interpreted by one or more processors of a computer system (e.g., by a processor thread), the computer system is caused to perform a function. Such a structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hardcoded or hard-wired logic gates, that are implemented exclusively or near-exclusively in hardware, such as within a field-programmable gate array (FPGA), an application-specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description above, embodiments are described with reference to acts that are performed by one or more computer systems. If such acts are implemented in software, one or more processors (of the associated computer system that performs the act) direct the operation of the computer system in response to having executed computer-executable instructions that constitute an executable component. For example, such computer-executable instructions may be embodied in one or more computer-readable media that form a computer program product. An example of such an operation involves the manipulation of data. If such acts are implemented exclusively or near-exclusively in hardware, such as within an FPGA or an ASIC, the computer-executable instructions may be hardcoded or hard-wired logic gates. The computer-executable instructions (and the manipulated data) may be stored in the memory 804 of the computer system 800. Computer system 800 may also contain communication channels 808 that allow the computer system 800 to communicate with other computer systems over, for example, network 810.

While not all computer systems require a user interface, in some embodiments, the computer system 800 includes a user interface system 812 for use in interfacing with a user. The user interface system 812 may include output mechanisms 812A as well as input mechanisms 812B. The principles described herein are not limited to the precise output mechanisms 812A or input mechanisms 812B as such will depend on the nature of the device. However, output mechanisms 812A might include, for instance, speakers, displays, tactile output, holograms, and so forth. Examples of input mechanisms 812B might include, for instance, microphones, touchscreens, holograms, cameras, keyboards, mouse or other pointer input, sensors of any type, and so forth.

Embodiments described herein may comprise or utilize a special purpose or general-purpose computer system, including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special-purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special-purpose computer system.

A "network" is defined as one or more data links that enable the transport of electronic data between computer systems and/or modules and/or other electronic devices. When information is transferred or provided over a network or another communications connection (either hard-wired, wireless, or a combination of hard-wired or wireless) to a computer system, the computer system properly views the connection as a transmission medium. Transmissions media can include a network and/or data links that can be used to carry desired program code means in the form of computer-executable instructions or data structures and which can be accessed by a general-purpose or special-purpose computer system. Combinations of the above should also be included within the scope of computer-readable media.

Further, upon reaching various computer system components, program code means in the form of computer-executable instructions or data structures can be transferred automatically from transmission media to storage media (or vice versa). For example, computer-executable instructions or data structures received over a network or data link can be buffered in RANI within a network interface module (e.g., a "NIC"), and then eventually transferred to computer system RANI and/or to less volatile storage media at a computer system. Thus, it should be understood that storage media can be included in computer system components that also (or even primarily) utilize transmission media.

Computer-executable instructions comprise, for example, instructions and data which, when executed at a processor, cause a general-purpose computer system, special purpose computer system, or special purpose processing device to perform a certain function or group of functions. Alternatively or in addition, the computer-executable instructions may configure the computer system to perform a certain function or group of functions. The computer-executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, data centers, wearables (such as glasses) and the like. The invention may also be practiced in distributed system environments where local and remote computer systems, which are linked (either by hard-wired data links, wireless data links, or by a combination of hard-wired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

The previous figures may discuss various computer systems which may correspond to the computer system 800 described herein. The computer systems of the previous figures include various components or functional blocks that may implement the various embodiments disclosed herein, as will be explained. The various components or functional blocks may be implemented on a local computer system or may be implemented on a distributed computer system that includes elements resident in the cloud or that implement aspect of cloud computing. The various components or functional blocks may be implemented as software, hardware, or a combination of software and hardware. The computer systems of the remaining figures may include more or less than the components illustrated in the figures, and some of the components may be combined as circumstances warrant. Although not necessarily illustrated, the various components of the computer systems may access and/or utilize a processor and memory, such as processing unit 802 and memory 804, as needed to perform their various functions.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system comprising:
one or more processors; and
one or more computer-readable media having stored thereon computer-executable instructions that are structured such that, when the computer-executable instructions are executed by the one or more processors, the computer system is configured to:
provide an intelligent machine-learning (ML) model catalog containing data associated with a plurality of ML models, wherein the plurality of ML models are trained over a plurality of training datasets respectively, and the intelligent ML model catalog contains at least a plurality of training data spaces of embeddings generated based on the plurality of ML models and the plurality of training datasets respectively;
receive a user dataset; and
for an ML model in the plurality of ML models, extract a user data space of embeddings from the user dataset based on the ML model;

obtain a training data space of embeddings extracted from a training dataset based on the ML model, wherein the ML model was trained using the training dataset;

evaluate the user dataset based at least on evaluating the user data space of embeddings against the training data space of embeddings to identify a relationship between the user dataset and the training dataset;

determine that the ML model is a good fit for the user dataset based at least on the relationship between the user dataset and the training dataset; and recommend the ML model in the intelligent ML model catalog as a good fit for the user dataset, including displaying a multi-dimensional chart within a user interface, the multi-dimensional chart visualizing one or more of the user data space of embeddings or the training data space of embeddings.

2. The computer system of claim 1, wherein evaluating the user data space of embeddings against the training data space of embeddings includes at least one of (1) dimensionality evaluation, (2) robustness evaluation, (3) statistical properties of clustering evaluation, or (4) search performance evaluation.

3. The computer system of claim 1, wherein evaluating the user data space of embeddings against the training data space of embeddings further includes:

computing a first set of metrics for each of the user dataset and the training dataset based on the user data space and the training data space, the first set of metrics including at least one of (1) a randomness score, (2) kNN distance statistics, (3) between-cluster separation, (4) within-cluster homogeneity, (5) data likelihood scores for a given clustering, (6) neighborhood purity statistics, (7) k-nearest neighbor (kNN) recall statistics, (8) average silhouette width; and evaluating the first set of metrics computed based on the user data space against the first set of metrics computed based on the training data space.

4. The computer system of claim 1, wherein evaluating the user data space of embeddings against the training data space of embeddings further includes:

applying a clustering model created for the training data space to the user data space;

computing a first set of cluster metrics for the training data space of embeddings based on original clustering;

computing a second set of cluster metrics for the user data space of embeddings clustered by application of training data space's clustering model; and comparing the first set of cluster metrics and the second set of cluster metrics.

5. The computer system of claim 1, wherein evaluating the user data space of embeddings against the training data space of embeddings further includes measuring discriminative topological features between the user data space and the training data space, the discriminative topological features including at least one of persistent homology or graph alignment.

6. The computer system of claim 4, wherein evaluating the user data space of embeddings against the training data space of embeddings further includes:

computing a second set of metrics for each of the user dataset and the training dataset based on the user data space, the training data space, and cluster assignments, the second set of metrics including at least one of (1) a Hausdorff distance, (2) an energy distance, (3) a distribution distance; and evaluating the second set of metrics for the user dataset against the second set of metrics for the training dataset.

7. The computer system of claim 1, wherein evaluating the user data space of embeddings against the training data space of embeddings further includes:

computing a third set of metrics for the user dataset based on the user data space, the training data space, and a user input; and evaluating the third set of metrics.

8. The computer system of claim 1, wherein determining whether an ML model is a good fit for the user dataset includes at least one of (1) how well the user data space of embeddings will result in a classification task, or (2) how likely the user data space of embeddings will produce reasonable similarity search results.

9. The computer system of claim 1, wherein evaluating the user dataset further includes:

extracting metadata for each of the user dataset and the training dataset, and evaluating the metadata of the user dataset against the metadata of the training dataset.

10. The computer system of claim 1, the computer system further configured to create the intelligent ML model catalog, creating the intelligent ML model catalog comprising:

for each ML model in the plurality of ML models, extracting a training data space of embeddings based on the ML model and the training dataset that is used to train the ML model; and storing the training data space of embeddings in the intelligent ML model catalog.

11. The computer system of claim 1, wherein, the computer system is further configured to add data associated with a new ML model to the intelligent ML model catalog, the new ML model being trained over a new training dataset, and adding the new ML model to the intelligent ML model catalog includes:

extracting a training data space of embeddings based on the new ML model and the new training dataset that is used to train the new ML model; and storing the training data space of embeddings in the intelligent ML model catalog.

12. The computer system of claim 1, the computer system further configured to visualize the training data space of embeddings and the user data space of embeddings in a multi-dimensional chart.

13. The computer system of claim 1, wherein the computer system is further configured to recommend a number of ML models in the intelligent ML model catalog that are best fit for the user dataset.

14. The computer system of claim 13, the computer system further configured to visualize a training data space of embeddings corresponding to a training dataset used to train a ML model that is a best fit for the user dataset and the user data space of embeddings in a multi-dimensional chart.

15. A method implemented at a computer system for recommending machine-learning (ML) models for any given user dataset, the method comprising:

receiving a user dataset; and for an ML model of a plurality of ML models, extracting a training data space of embeddings from a training dataset based on the ML model, wherein the training dataset was used to train the ML model;

extracting a user data space of embeddings from the user dataset based on the ML model;

evaluating the user dataset based at least on evaluating the user data space of embeddings against the training data space of embeddings to identify a relationship between the user dataset and the training dataset;

determining that the ML model is a good fit for the user dataset based at least on the relationship between the user dataset and the training dataset; and recommending the ML model in an intelligent ML model catalog as a good fit for the user dataset, including displaying a multi-dimensional chart within a user interface, the multi-dimensional chart visualizing one or more of the user data space of embeddings or the training data space of embeddings.

16. The method of claim 15, wherein evaluating the user data space of embeddings against the training data space of embeddings includes at least one of (1) dimensionality evaluation, (2) robustness evaluation, (3) statistical properties of clustering evaluation, or (4) search performance evaluation.

17. The method of claim 15, wherein evaluating the user data space of embeddings against the training data space of embeddings further includes:

computing a first set of metrics for each of the user dataset and the training dataset based on the user data space and the training data space, the first set of metrics including at least one of (1) a randomness score, (2) a kNN distance statistic, (3) between-cluster separation, (4) within-cluster homogeneity, (5) data likelihood scores for a given clustering, (6) neighborhood purity statistics, (7) k-nearest neighbor (kNN) recall statistics, (8) average silhouette width; and evaluating the first set of metrics computed based on the user data space against the first set of metrics computed based on the training data space.

18. The method of claim 15, wherein evaluating the user data space of embeddings against the training data space of embeddings further includes:

applying a clustering model created for the training data space to the user data space;

computing a first set of cluster metrics for the training data space of embeddings based on original clustering;

computing a second set of cluster metrics for the user data space of embeddings clustered by application of training data space's clustering model; and comparing the first set of cluster metrics and the second set of cluster metrics.

19. The method of claim 18, wherein evaluating the user data space of embeddings against the training data space of embeddings further includes:

computing a second set of metrics for each of the user dataset and the training dataset based on the user data space, the training data space, and cluster assignments, the second set of metrics including at least one of (1) a Hausdorff distance, (2) an energy distance, (3) a distribution distance; and evaluating the second set of metrics for the user dataset against the second set of metrics for the training dataset.

20. A computer program product comprising one or more hardware storage devices having stored thereon an intelligent machine-learning (ML) model catalog and computer-executable instructions, the intelligent ML model catalog containing at least a plurality of training data spaces of embeddings generated based on a plurality of ML models and a plurality of training datasets that were used to train the plurality of ML models respectively, and the computer-executable instructions being structured such that, when the computer-executable instructions are executed by one or more processors of a computer system, the computer system is configured to at least:

receive a user dataset; and for an ML model in the plurality of ML models, extract a user data space of embeddings from the user dataset based on the ML model;

obtain a training data space of embeddings extracted from a training dataset based on the ML model, wherein the ML model was trained using the training dataset;

evaluate the user dataset based at least on evaluating the user data space of embeddings against the training data space of embeddings to identify a relationship between the user dataset and the training dataset;

determine that the ML model is a good fit for the user dataset based at least on the relationship between the user dataset and the training dataset; and recommend the ML model in the intelligent ML model catalog as a good fit for the user dataset, including displaying a multi-dimensional chart within a user interface, the multi-dimensional chart visualizing one or more of the user data space of embeddings or the training data space of embeddings.

* * * * *